United States Patent [19]

Geusic

[11] 3,781,833

[45] Dec. 25, 1973

[54] SINGLE WALL MAGNETIC DOMAIN GENERATOR

[75] Inventor: Joseph Edward Geusic, Berkeley Heights, N.J.

[73] Assignee: Bell Telephone Laboratories, Incorporated, Murray Hill, Berkeley Heights, N.J.

[22] Filed: Aug. 29, 1972

[21] Appl. No.: 284,576

[52] U.S. Cl. .................... 340/174 TF, 340/174 SR

[51] Int. Cl. .................... G11c 19/00, G11c 11/14

[58] Field of Search .................... 340/174 TF

[56] References Cited

UNITED STATES PATENTS 3,611,331 10/1971 Bonyhard .................... 340/174 TF

*Primary Examiner*—James W. Moffitt

*Attorney*—W. L. Keefauver et al.

[57] ABSTRACT

Improved operating margins are exhibited by a conductor driven, single wall, magnetic domain generator because of the geometry of the conductor and its disposition with respect to the magnetically soft elements which define the generator and the propagation circuitry.

9 Claims, 10 Drawing Figures

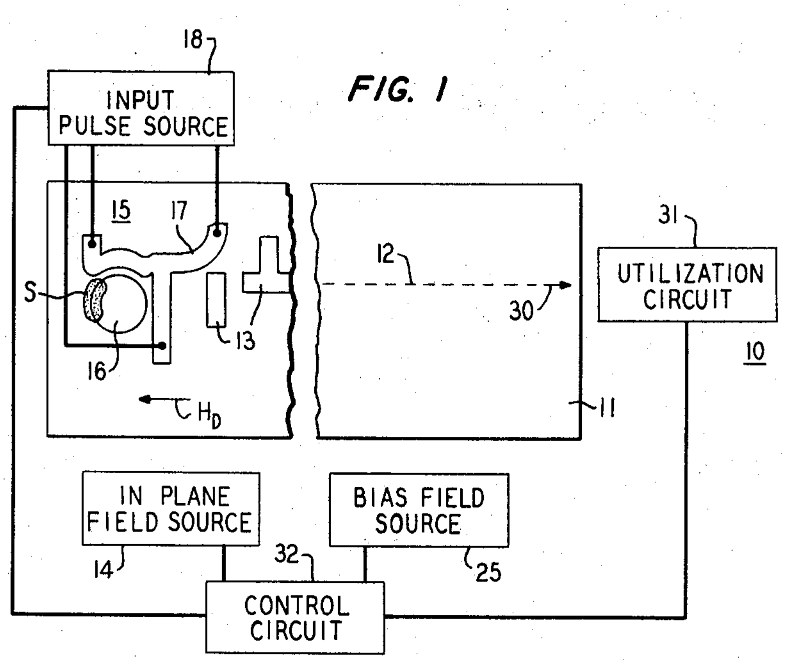
FIG. 2
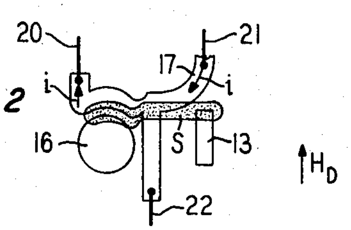
FIG. 4
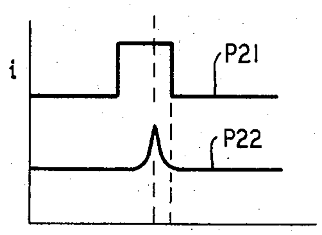
FIG. 3
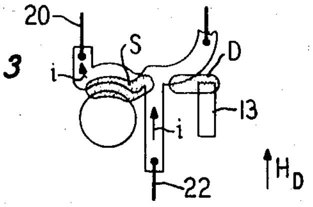
FIG. 5
PRIOR ART
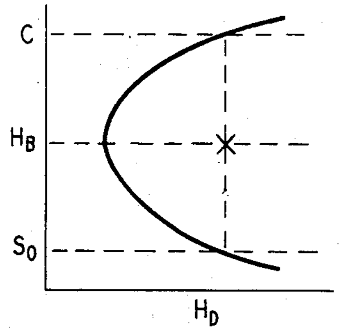
FIG. 9
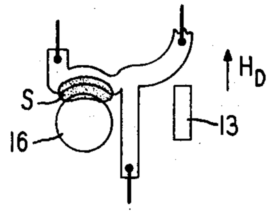

SINGLE WALL MAGNETIC DOMAIN GENERATOR

FIELD OF THE INVENTION

This invention relates to magnetic storage apparatus and more particularly to an arrangement for generating single wall domain patterns representative of information in such apparatus.

BACKGROUND OF THE INVENTION

Single wall magnetic domain (or magnetic bubble) apparatus employing a "field access" mode of operation is described in U.S. Pat. No. 3,534,347 of A. H. Bobeck issued Oct. 13, 1970. A generator of domains for movement in such apparatus is described in U.S. Pat. No. 3,611,331 of P. I. Bonyhard, issued Oct. 5, 1971. Typically, field access operation employs a magnetic field rotating in the plane of domain movement cooperating with a pattern of magnetically oft elements adjacent a face of that layer for generating magnetic pole patterns which change in response to the field reorientations to move a domain along a channel defined by the pattern.

The generator, too, comprises a magnetically soft element about the periphery of which a "seed" domain moves. Data-representing domains are cut from the seed domain by periodically stretching a domain from the generator across a cutting position to a channel-defining element and then dividing the domain into two by providing a cutting field, antiparallel to the magnetization of the domain, at the cutting position.

It has been found in practice that the operating margins exhibited by generators of this type are narrower than expected for a variety of reasons. One of these reasons is that the operating diameter of a domain is determined by a uniform bias field antiparallel to the direction of magnetization of a domain. When the bias field is high, the (domain) bubble diameter is small and frequently is either not properly positioned or is too small to be cut when the cutting field is generated.

BRIEF DESCRIPTION OF THE INVENTION

The present invention is directed at a single wall domain generator which exhibits wide operating margins. In accordance with this invention, a seed domain is moved about the periphery of a generator element in response to a reorienting (viz: rotating) in-plane field as in the abovementioned patent of P. I. Bonyhard. The generator element and the adjacent channel-defining elements, however, are spaced apart a sufficient distance to ensure that the seed domain is unable to stretch therebetween during operation solely in response to the in-plane field. In addition, an electrical conductor is provided in a position to generate a field parallel to the magnetization of the seed domain between the generator and the adjacent channel-defining element for stretching the domain therealong. The conductor is of a geometry such that the current path therethrough during the stretching operation changes orientation with respect to the stretched domain to effect the cutting operation.

In one specific embodiment, a cutting conductor, of T-shaped geometry, bridges the space between the generator and the adjacent channel-defining element to stretch a domain therebetween when a current pulse is applied between first and second terminals across the top of the T. The conductor includes a secondary path, through the base of the T, which intersects the stretched domain and is operative to cut the domain when a current spike is applied between the first terminal and a third terminal to the secondary path.

BRIEF DESCRIPTION OF THE DRAWING

FIG. 1 is a schematic representation of a domain propagation arrangement including a domain generator in accordance with this invention;

FIGS. 2, 3, and 9 are schematic representations of portions of the arrangement of FIG. 1 showing the magnetic conditions thereof during operation;

FIGS. 5 and 7 are graphs showing typical margin plots of a prior art domain generator;

FIGS. 4 and 8 are graphs showing a typical pulse diagram and margin plot of a domain generator of the type shown in FIG. 1 for comparison with the graphs of FIGS. 5 and 7.

DETAILED DESCRIPTION

Figure 6:
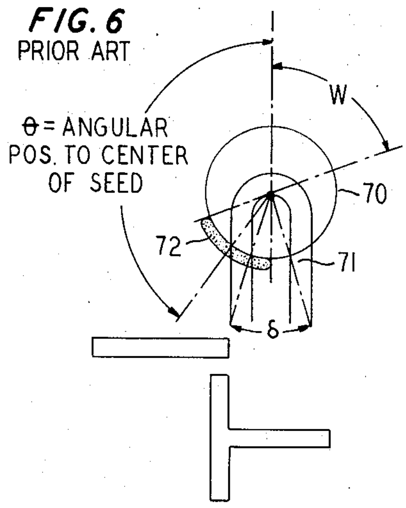
FIG. 6 is a schematic representation of a reference prior art generator.

FIG. 1 shows a single wall domain arrangement 10 comprising a layer of material 11 in which single wall domains can be moved. The arrangement is operative in the "field access" mode to move domains along a channel represented by broken line 12 and typically defined by familiar magnetically soft T and bar shaped elements 13. Movement of domains in the channel is in response to a magnetic field rotating in the plane of layer 11 and supplied by a means represented by block 14 of FIG. 1.

Domains for movement along a channel are generated at a generator 15 in FIG. 1. The generator comprises a magnetically soft disk 16 about the periphery of which a seed domain S moves in a manner to follow the orientation of the in-plane field $H_D$. A conductor 17 is associated with disk 16 for first stretching and then dividing a seed domain into a data domain and a new seed domain when pulsed by an input pulse source represented by block 18 in FIG. 1.

The geometry of conductor 17 and the disposition of that conductor with respect to the disk 16 and the adjacent channel defining element 13 of FIG. 2 is important in the realization of wide operating margins. As can be seen from FIG. 2, for example, conductor 17 has a distorted T shaped geometry with electrical connections 20, 21, and 22 thereto. When source 18 of FIG. 1 applies, to conductor 17, a current, represented by arrows *i* in FIG. 2, a "positive" field directed upward out of the plane of the drawing is generated along the lower edge of the top part of the conductor. For the present description, a domain is assumed to have its magnetization directed upward out of the plane of the drawing and the remainder of layer 11 is assumed to have its magnetization directed into the plane of the drawing, an antiparallel direction. For an in-plane field directed upwards as indicated by arrow $H_D$ in FIG. 2, positive poles (+) are generated in the upward portion of both element 16 and the adjacent channel-defining element 13 as indicated in the figure.

Domain S, in response to such a pulse, strips out horizontally along conductor 17 "latching onto" the positive pole in element 13. A current spike is applied at terminal 22 as indicated by arrows *i* in FIG. 3 either in the presence of the current pulse applied at terminal 21 or after its termination. The timing of the pulses is indicated by the waveforms P21 and P22 of FIG. 4. The result is the separation of the seed domain into a data domain D and a new seed domain S. The domains assume a circular geometry determined by a bias field antiparallel to the magnetization of the domain and supplied by a source represented by block 25 of FIG. 1.

A consideration of the operating margins of such a generator are helpful as a context for understanding the principles governing structures operative in accordance with the invention. A convenient test for acceptable operating margins for a generator is that the generator is operable over a range for which a seed domain propagates stably around a disk, a range typically greater than that over which domains can be propagated in layer 11. The "propagate" margins, in turn, are defined by a plot of drive (in-plane) field $H_D$ gainst bias field $H_B$ as indicated in FIG. 5. It is well known that the bias field can vary only so much as to allow a domain to expand or contract by a factor of three between "strip out" and "collapse" diameters designated on the ordinate axis as C and SO, respectively. Typically, a spread of about 20 oersteds occurs between these two values. Moreover, there is usually a minimum drive field of about 10 oersteds below which domains are not propagated. This limit is due to the magnetically soft material of element 13, the geometry of the element, and the spacing between the element and layer 11. The curve shown in FIG. 5 is a typical margin characteristic for 100 kilohertz operation (in-plane field cycle time).

The bias field is usually selected to bias a domain at an operating diameter midway between the strip out and collapse diameters and the value of the drive field is selected somewhat above the lowest drive position, a point marked X in the figure, at which a relatively enlarged margin "window" occurs. Such margin curves are well known in the art.

The generator margins are now discussed in terms of a reference prior art structure, the foregoing propagate margins, and the bias range over which a seed domain exists stably on a disk.

In a typical prior art generator (FIG. 6), the operation depends on several factors. The figure shows, for example, a magnetically soft disk 70 and a hairpin-shaped conductor 71 overlying the disk for generating domains from a seed domain 72. The first factor with respect to such a generator is that the seed domain is required to be long enough to cut, i.e., the seed must extend beyond the center-to-center spacing of the control conductor (71). The minimum size of the seed is defined when the seed subtends the angle $\delta$ shown in the figure and defined at the periphery of disk 70. When the seed is smaller than this minimum, cutting often results in seed loss and/or failure to generate. Consequently, high bias operation (viz: operation with small domains) is limited.

In the prior art design of FIG. 6, on the other hand, the conductor center-to-center spacing at the perimeter of the permalloy disk (angle $\delta$) can be reduced to attain operation at relatively high bias fields. But such reduction is meaningful primarily to the extent that the disk size is also reduced since the critical angle $\delta$ is measured at that periphery. When one considers, in addition, the desirability to minimize disk diameter to achieve higher operating frequency, it becomes clear that such an approach requires the use of extremely narrow conductors and results in operation at above the familiar limiting current density of ($10^6$ amps/in.).

Consequently, with prior art generators it is difficult to achieve reliable generator operation over the entire bias range for which a seed is maintained on the disk under zero current conditions (in conductor 71) indicated for a typical operating drive field in FIG. 5 by the vertical broken line there.

Another factor which has to be considered in any practical use of any prior art generator is its sensitivity to the phasing of the current control pulse relative to the rotating field. Hence, the position of the seed with respect to the legs of the conductor 71 is important. It is clear that at any bias, the leading edge of the current pulse (i.e., when the seed is cut) has to be applied when a portion of the seed extends beyond the center of both legs of conductor 71 of FIG. 7 if two domains are to be found. At the lowest bias fields the seed is large and the phasing of the leading edge of the current pulse is least sensitive. It is important also (for consistency) that the bias field be chosen of a value such that the angle W (of FIG. 6), subtended by the seed, is comparable to $\delta$ and the duration of the current pulse is sufficiently long to allow the trailing cut portion of the seed to be transferred (stretched) to the first propagate element. Consequently, phasing considerations indicate further constraints on high bias operation. There is also a practical limit to the pulse length because if it is too long there is premature stripping of the seed beyond the first propagate element and a loss in the low bias margin.

Figure 7:
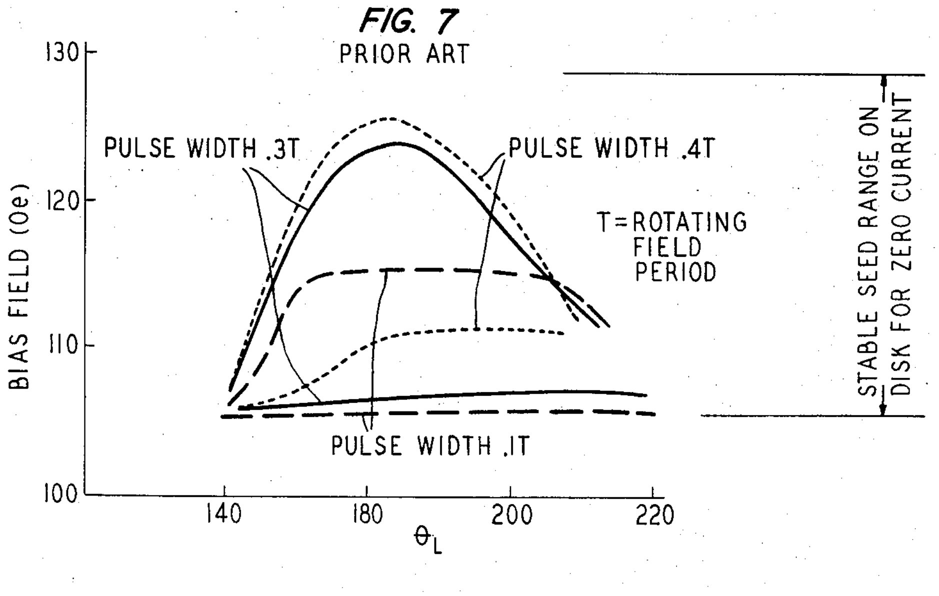

Curves which show the interplay of all these considerations on the margins of the prior art device results from a plot of the bias field (over which there is controlled generation) versus the cutting edge phase $\theta_L$ for (stretching-cutting) pulses of different duration (in terms of a rotating field cycle T) as shown in FIG. 7. Typical curves, too short (.1T), just right (.3T), and too long (.4T), are shown as dotted, solid, and dashed curves, respectively, in the figure. The loss of low bias field margins is shown by the increased elevation of the lower portions of the curves as pulse duration is increased. Also indicated is the bias range over which the seed exists on the disk for zero drive current in conductor 71.

The dotted curve shows a loss of high bias field margins due to the fact that at high bias, a short duration cutting pulse is insufficient to transfer (i.e., stretch a domain to the first propagate element). An increase in the duration of the cutting (which is also the stretching pulse in prior art arrangements) results in an improvement in the high bias margins as shown by the solid curve. But the improvement is attended by some loss in low bias margins. A further increase in cutting pulse durations further improves high bias margins with an attending substantial loss in low bias margins as shown by the dotted curve. And still the stable seed range is not achieved as shown in FIG. 7. The sharpness of the curves is due to small seed size and critical phasing.

Consequently, it should be clear at this juncture that a generator which includes a conductor operative to both cut a seed and transfer one of the resulting domains reflects somewhat limited margins at least at one end of the range but typically at both ends and does not exhibit satisfactory margins over the entire range for which a seed exists on disk 70 of FIG. 6.

The generator shown in FIGS. 1 and 2, in contradistinction, exhibits full bias range of operation, insensitivity to phasing, and high frequency of operation without compromise. This result is achieved by having the functions of seed cutting and domain transfer mutually orthogonal in a functional sense. This geometry also tends to protect the seed even for extreme conditions where the generator function may be erratic because the seed is always in a stretching environment. In operation, for example, a current in ports (or connections) 20 to 21 of FIG. 2 first strips (or stretches) the seed to the first propagate element. The following current in ports 22–20 cuts the stretched domain. Under these conditions the strip on the disk is always in a bias field so as to strip or grow the domain. Hence seed collapse under high bias conditions is eliminated.

It is also recognized that the angular size of the seed on the generator disk is not important in a generator of the type shown in FIG. 1 since cutting occurs after the seed has been stretched from the disk to the adjacent propagate element. In a generator in accordance with this invention, the timing of the cutting pulse is also a less important factor but is applied typically as a short duration pulse toward the end of the stretching pulse as shown in FIG. 4.

Figure 8:
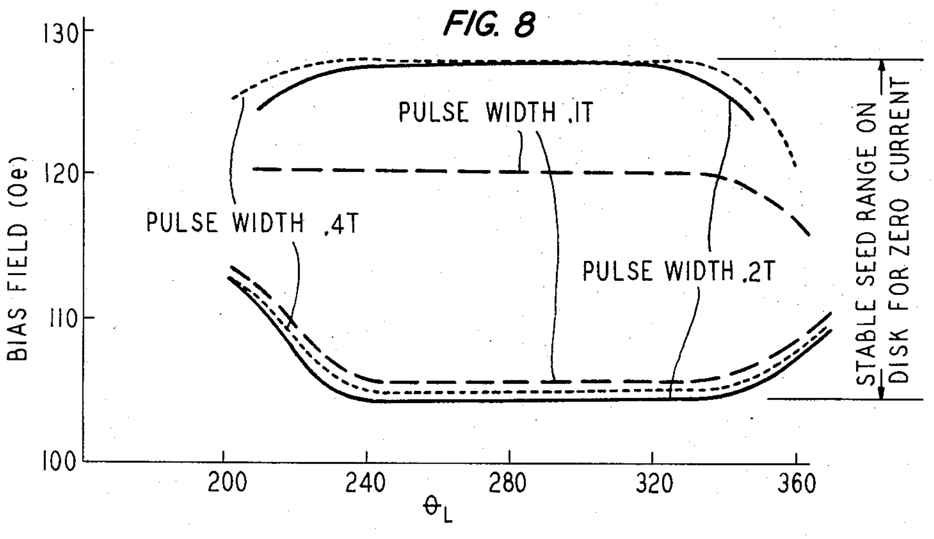

A graph similar to that of FIG. 7 but for a typical generator in accordance with this invention is shown in FIG. 8. For the shortest duration pulse .1T, poor high bias margins are exhibited because of insufficient drive to move the head of the seed domain beyond the cutting conductor. An increased duration pulse .2T as shown by the solid line, on the other hand, improves the high bias margins to the full range of seed retention as shown; and this with only negligible sacrifice of low bias margins.

Further increase in pulse duration to .4T as shown by the dotted curve shows no further improvement in high bias operation or deterioration of low bias operation. Consequently, the present design results in optimum operation merely by exceeding some minimum value of stretching pulse duration.

In addition, the high bias field margin loss with short duration stretching pulses can be reduced by moving the cutting conductor (between 16 and 13 of FIG. 1) closer to 16.

Phasing considerations are less important also. For example, from FIG. 8 it is clear that the cut pulse phase position is such that it can be applied any time after the stretching pulse has taken the one end of the seed beyond the cut conductor 22–20 of FIG. 2.

In both prior art generators and those in accordance with this invention, the bias field margins as a function of rotating (drive) field are determined and limited by the adjacent propagate element and the size of the disk. In general, if one uses a domain material (layer 11 of FIG. 1) near its mobility limit, the highest frequency operation and best operating bias field margins can be achieved with the lowest rotating field drive much more easily with the generator in FIGS. 1 and 2, since the disk size can be reduced without reducing conductor size. This has been experimentally verified.

If a pulse of FIG. 4 is absent, no data domain is generated during the associated in-plane field cycle, as indicated in FIG. 9. In this instance, (seed) domain S merely recirculates about disk 16. The adjacent element 13 is spaced apart from the disk 16 a distance such that domain S does not strip out thereacross under these conditions. Consequently, a data stream, comprising the presence and absence of domains, can be generated selectively for movement along channel 12 of FIG. 1 for detection at an output position indicated by arrow 30. A signal indicating the presence of a domain during a given cycle of the in-plane field is applied to a utilization circuit represented by block 31 of FIG. 1.

Circuit 31 and sources 14 and 25 operate under a control circuit represented by block 32 of FIG. 1. The various sources and circuits may be any such elements capable of operating in accordance with this invention.

Figure 10:
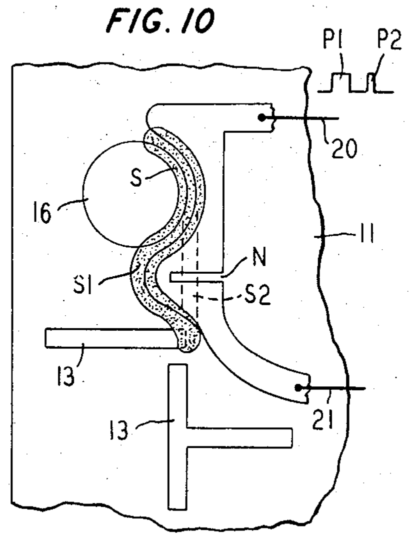
FIG. 10 is a schematic representation of a portion of an arrangement alternative to that shown in FIG. 1.

It is stated hereinbefore that advantage is taken of the variation of a current path with respect to the magnetically soft elements between which a domain is stretched in response to a current in the path. In the embodiment of FIG. 1, the conductor is of a geometry so that different current paths can be determined by the selected two of three terminals thereto between which current flows. FIG. 10 shows a two-terminal alternative to the arrangement of FIGS. 1 and 2. Like designations are used to facilitate comparison between the embodiments of FIG. 10 and FIGS. 1 and 2. The figure shows a generator including a magnetically soft disk 16 about which a seed domain S moves in a counterclockwise direction in response to a magnetic field rotating counterclockwise in the plane of layer 11. A two-terminal conductor 20–21 is shown of a geometry to conform with a portion of disk 16 and to extend to an adjacent channel-defining element 16.

The conductor includes a notch N. A pulse train (supplied by a source not shown and) comprising two pulses P1 and P2, as shown in FIG. 10, are operative to stretch the seed S to adjacent channel-defining element 13 as shown in S1, to relax the domain to the position of broken curved line S2 (crossing notch N), and finally to cut the seed into a new seed domain and a data domain such as shown in FIG. 3.

It should be clear at this junction that the separation of the stretching and cutting functions leads to improved margins and that a simple conductor driven generator to achieve such separation can be achieved first by stretching a domain and thereafter reorienting the stretched to a position transverse to the stretching field.

This general principle of this invention can be extended to other than generator circuits. For example, the replacement of disk 16 by an element of a domain propagation channel operative, for example, responsive to a rotating in-plane field to move domain patterns into the position of seed S in FIG. 9, functions as a replication circuit. Such a circuit is attended by the wide operating margins characteristic of the generator of FIGS. 1 or 10.

What has been described is considered merely illustrative of the principles of this invention. Therefore, various modifications in accordance with these principles can be devised by those skilled in the art within the spirit and scope of this invention.

What is claimed is:

1. Single wall magnetic domain apparatus comprising a layer of material in which single wall domains can be moved, first and second spaced apart magnetically soft elements coupled to said layer, said first element being adapted to provide a first domain at a first position in response to a magnetic field in a first orientation in the plane of said layer, said second element being adapted to attract a domain thereto when said field is in said first orientation, and an electrical conductor coupled to said layer and responsive to a first pulse applied thereto for generating along a first axis between said elements a field parallel to the magnetization of said first domain for stretching said domain between said first position and said second element, and means for changing the relative positions of said parallel field and said first axis in a manner such that in response to a second pulse applied to said conductor a field is generated thereby to cut said stretched domain.

2. Apparatus in accordance with claim 1 also including a plurality of third elements for defining a first channel between said second element and an output position for moving domains therealong in response to said magnetic field reorienting in said plane.

3. Apparatus in accordance with claim 2 wherein said first element is of a geometry for moving a domain thereabout periodically past said first position responsive to said reorienting field.

4. Apparatus in accordance with claim 3 wherein said electrical conductor includes first, second and third connections thereto, said conductors being of a geometry such that a first pulse between said first and third connections generates said parallel field for stretching a domain along said first axis and a second pulse between said first and second connections is operative to cut said stretched domain.

5. Apparatus in accordance with claim 4 also including means for supplying said reorienting magnetic field in said first direction in the presence of said first pulse.

6. Apparatus in accordance with claim 2 wherein said first element is included in a second domain channel.

7. Apparatus in accordance with claim 5 also including means for providing said second pulse as a short duration spike at the termination of said first pulse.

8. Apparatus in accordance with claim 3 wherein said electrical conductor includes a notch therein transverse to said first axis and being of a geometry such that a domain stretched between said first and second positions avoids said notch in response to said first pulse and extends across said notch in the absence of said pulse.

9. Apparatus in accordance with claim 8 also including means for providing said first and second pulses, said second pulse being operative to cut a domain extending across said notch.

* * * * *